Patented Apr. 24, 1928.

1,667,318

UNITED STATES PATENT OFFICE.

MAX ISLER AND LUCAS von MECHEL, OF BASEL, SWITZERLAND, ASSIGNORS TO THE FIRM: SOCIETY OF CHEMICAL INDUSTRY IN BASLE, OF BASEL, SWITZERLAND.

AZODYESTUFFS DERIVED FROM 1:8-NAPHTHALENE DICARBOXYLIC ACID AND PROCESS OF MAKING THE SAME.

No Drawing. Application filed August 3, 1925, Serial No. 48,004, and in Switzerland August 16, 1924.

This invention relates to new azodyestuffs valuable for the production of fast tints on the fibre. It comprises the new products, the process of making the same, and the material dyed with the new dyestuffs.

It has been found that new dyestuffs may be obtained by converting 3-amino-1.8-naphthalene-dicarboxylic acid into azodyestuffs. This may be done, either by combining it with diazo compounds, or by diazotizing said dicarboxylic acid and coupling it with coupling components. There are thus obtained dyestuffs which are derived from 3-aminonaphthalene-1.8-dicarboxylic acid, the general formula of which is characterized by the presence of a 1.8-naphthalic acid complex

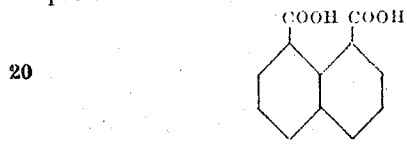

not containing any hydroxyl groups. The new dyestuffs form yellow to brown and black powders, dissolving in water with yellow to brown, violet and blue, in sulfuric acid with greenish-yellow, orange to brown, bluish-red and greenish-blue coloration and dyeing wool in an acid bath yellow to brown, violet and grayish-blue tints. Owing to the presence of the two carboxylic groups all these dyestuffs are more or less pronounced mordant dyestuffs.

Example 1.

10.7 parts of 3-aminonaphthalene-1.8-dicarboxylic acid anhydride are dissolved, by means of 10 parts of caustic soda solution of 30% strength in 150 parts of hot water. After addition of 10 parts of soda the solution is allowed to cool and treated with a diazo solution obtained from 8.5 parts of 1-aminobenzene-4-sulfonic acid. The dyestuff thus obtained is isolated by addition of common salt, filtered and dried. It forms a yellowish-brown powder, dissolving in water with yellowish-red, in concentrated sulfuric acid with brown coloration. It dyes wool in an acid bath brick-red tints fast to washing, changing very little and becoming fast, especially fast to potting, by treatment with chromium. When printed in presence of chromium mordants it yields orange tints. The new dyestuff in form of its sodium salt corresponds most probably with the following formula:

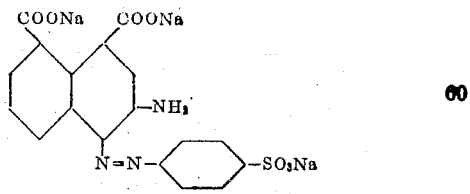

If instead of sulfanilic acid other aminosulfonic acids are employed, as for instance toluidine-, chloroaniline-, aminophenol-ether-, naphthylamine-sulfonic acids, etc., analogous dyestuffs are obtained. The corresponding unsulfonated amines as well as the aminocarboxylic acids yield less soluble dyestuffs. Dyestuffs yielding blue shades are obtained with p-nitraniline derivatives as coupling components; thus the dyestuff from 1-diazo-4-nitrobenzene-2-sulfonic acid and 3-amino-1.8-naphthalene dicarboxylic acid for instance dyes wool violet tints fast to washing.

Example 2.

A solution of 3-aminonaphthalene-1.8-dicarboxylic acid is prepared according to the indications of Example 1 and this solution is treated with a diazo solution prepared from 11.7 parts of 5-nitro-2-amino-1-phenol-4-sulfonic acid. The dyestuff thus obtained is isolated by addition of common salt, filtered and dried. It forms a brownish-black powder, dissolving in water with violet-red, in sulfuric acid with yellowish-brown coloration. The new dyestuff yields on wool red tints, changing to yellowish-green and becoming fast, especially fast to potting, by after-treatment with chromium. When printed on cotton in presence of a chromium mordant it yields yellowish-green tints.

The new dyestuff in form of its sodium salt corresponds most probably with the following formula:

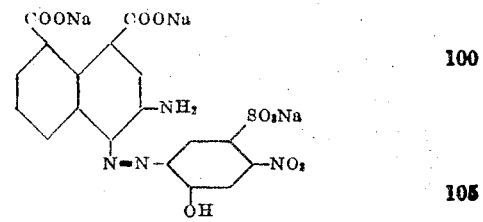

Analogous dyestuffs are obtained with other ortho-aminophenols or ortho-aminophenol sulfonic acids as the different chloro-, nitro-, and methyl-ortho-aminophenol-sulfonic acids, whereas the use of carboxylic acids of ortho-aminophenols leads generally to dyestuffs which become brown to Bordeaux by after-treatment with chromium.

*Example 3.*

10.6 parts of 3-aminonaphthalene-1.8-dicarboxylic acid anhydride are dissolved in 150 parts of hot water by means of 10 parts of a caustic soda solution of 30 per cent strength and treated after cooling at about 20° C. with 30 parts of ice and 25 parts of hydrochloric acid of 30 per cent strength. 3-aminonaphthalene-1.8-dicarboxylic acid separates which, after addition of 35 parts of nitrite, dissolves first and precipitates after a short time as diazo compound. The suspension thus obtained is poured into an alkaline solution of 6.9 parts of salicylic acid; the coupling being achieved, the excess of alkali is neutralized with acid and the dyestuff salted out, filtered and dried. It forms an easily soluble, yellow crystalline powder, dissolving in water with yellow, in sulfuric acid with orange-yellow coloration and yields on wool when dyed in an acid bath, yellow tints which become very fast, especially fast to potting by after-treatment with chromium. When printed with chromium mordants the new dyestuff yields fast, pure yellow tints. The dyestuff in form of its sodium salt corresponds most probably with the following formula:

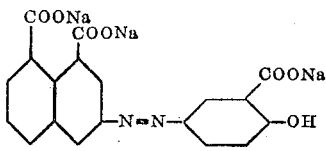

Analogous dyestuffs are obtained with cresotinic acid; further yellow mordant dyestuffs are obtained with the components for yellow dyestuffs as for instance aceto-acetic ester or arylides of same, methylketol, 1-arylpyrazolones, especially those containing carboxylic groups.

Red dyestuffs are obtained with β-naphthol ethyl-β-naphthylamine, naphthol- and dihydroxy-naphthalene sulfonic acids. Naphthylamine sulfonic acids yield generally brown dyestuffs.

*Example 4.*

10.6 parts of 3-amino-1.8-dicarboxylic acid anhydride are diazotized as indicated in the preceding example and the diazo suspension thus obtained is poured into an alkaline solution of 16 parts of 1.8-aminonaphthol-4.6-disulfonic acid. Coupling occurs very rapidly and the dyestuff, isolated in the usual manner, forms a brown powder, dissolving in water and sulfuric acid with red-violet coloration. When dyed in an acid bath it yields on wool red-violet tints changing very little by after treatment with chromium. When printed in present of chromium mordants, it yields also red-violet tints.

The dyestuff in form of its sodium salt corresponds most probably with the following formula:

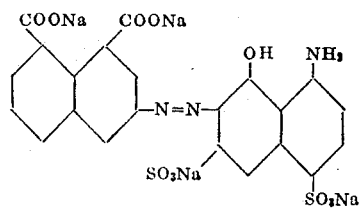

Analogous dyestuffs are obtained with the different 1.8-aminonaphthols and N-acidyl-derivatives of same. Other aminonaphtholsulfonic acids as the 2.8.6- or 2.5.7-aminonaptholsulfonic acids and the derivatives of same yield more yellow, and duller tints.

If the aminonaphthols are coupled in an acid solution or suspension, the coupling occurs in the nucleus carrying the amino group. The dyestuffs thus obtained are duller than those prepared in alkaline solution. The diazo-dyestuffs which contain aminonaphthols in middle position yield gray to black tints.

Thus the dyestuff obtained for example by coupling 3-amino-1.8-naphthalene dicarboxylic acid with 1.8-aminonaphthol-4.6-disulfonic acid in an acid solution, corresponding in form of its sodium salt most probably with the following formula:

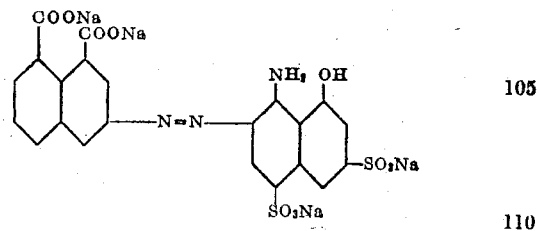

yields violet-brown tints, whereas the disazodyestuff obtained by coupling in an alkaline solution the above named dyestuff with a second molecule of 3-diazo-1.8-naphthalenedicarboxylic acid and corresponding in form of its sodium salt most probably with the following formula:

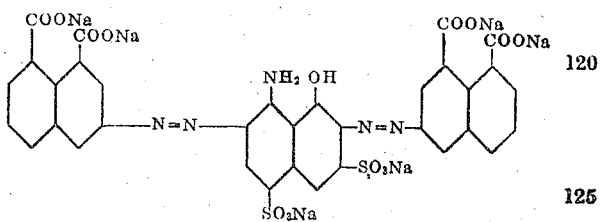

dissolves in water with blue coloration and yields on wool grayish-blue tints.

The following table shows some of the properties of the new dyestuffs.

| Diazotization component. | Coupling component. | Dyestuff powder. | Solution in water. | Solution in $H_2SO_4$. | Acid dyeing on wool. | Dyeing on wool after-chromed. | Chrome printing on cotton. |
|---|---|---|---|---|---|---|---|
| Aniline | 3-aminonaphthalene-1.8-dicarboxylic acid | Brownish-orange | Yellowish-red | Brownish-red | Red | Red | |
| o-toluidine | id. | Yellowish-brown | Yellow | Red | Orange | | |
| o-sulfanilic acid | id. | Reddish-brown | Reddish-yellow | Yellowish-red | Red | Red | Orange. |
| 1-amino-4-acetyl-amino-benzol-2-sulfonic acid | id. | Bluish-brown | id. | Greenish-yellow | Bluish-red | | Brown. |
| α-naphthylamine | id. | Reddish-brown | Yellow | Greenish-blue | Red | | Brown. |
| 4-chloro-5-sulfo-2-amino-1-phenol | id. | Blackish-brown | Yellowish-brown | Brown | Yellowish-olive | Yellowish-olive | Olive. |
| 5-nitro-4-sulfo-2-amino-1-phenol | id. | Brownish-black | Violet-red | Yellowish-brown | Red | Yellowish-green | Greenish-gray. |
| 4-chloro-6-nitro-2-amino-1-phenol | id. | Brown | Brownish-red | Reddish-brown | Brown | Olive | Gray. |
| 5-nitro-4-chloro-2-amino-1-phenol | id. | Greenish-black | Red-violet | Reddish-brown | Bluish-red | Green | Gray. |
| 4-sulfo-2-amino-1-phenol-6-carboxylic acid | id. | Brown-red | Bordeaux | Bordeaux | Yellowish-Bordeaux | Brown | Brown. |
| 4-chloro-2-amino-1-phenol-6-carboxylic acid | id. | Bluish-brown | Reddish-brown | Violet | Reddish-brown | Violet-brown | Brown. |
| 4-nitro-2-amino-1-phenol-6-carboxylic acid | id. | Reddish-brown | Brownish-yellow | Red | Bordeaux | Bordeaux | id. |
| 4.6-dinitro-2-amino-1-phenol | id. | Greenish-black | Brownish-red | Greenish-yellow | Greenish-brown | Yellow-olive | Olive. |
| 6-nitro-2-amino-1-phenol-4-carboxylic acid | id. | Brown | Reddish-brown | Reddish-brown | Reddish-brown | id. | |
| 4-amino-1-hydroxybenzol-2-carboxylic acid | id. | Reddish-brown | re- | Red | Red | Red-brown | Brown. |
| 4-nitro-1-amino-2-sulfonic acid | id. | Blackish-brown | Violet | Yellowish-brown | Violet | | Red-violet. |
| 6-nitro-2-amino-1-phenol-4-sulfonic acid | id. | Black | Violet-red | Brownish-yellow | | | Gray. |
| 3-aminonaphthalene-1.8-dicarboxylic acid | o-cresotinic acid | Orange-yellow | Yellow | Orange-yellow | Reddish-yellow | Reddish-yellow | Reddish-yellow. |
| 3-aminonaphthalene-1.8-dicarboxylic acid | 1-(-3' carboxyl)-phenyl-5-pyrazolone-3-carboxylic acid | Red | Orange-yellow | Yellow-brown | id. | Greenish-yellow | id. |
| id. | β-naphthol | Brownish-red | Red | Bordeaux | Red | Red | Red. |
| id. | ethyl-β-naphthylamine | Red | Yellowish-red | Blue | Red | Red | Reddish-brown. |
| 3-aminonaphthalene-1.8-dicarboxylic acid | 2-naphthylamine-6-sulfonic acid | Brown | Yellowish-brown | Bordeaux | Yellowish-brown | Yellowish-brown | Yellowish-brown Violet. |
| id. | 1.8-aminonaphthol-4-sulfonic acid (alkaline coupling) | Violet-brown | Bordeaux | Bluish-red | Reddish-violet | Reddish-violet | |
| id. | 1.8-dihydroxy-naphthalene-3.6-disulfonic acid | Grayish-black | id. | Violet | Bluish-red | Violet | Greenish-blue. |
| id. | 3-hydroxynaphthalene-1.8-dicarboxylic acid. | Black | Red | Bordeaux | Brownish-red | Brown | Red. |

What we claim is:—

1. As a new process the herein described coupling of 3-amino-naphthalene-1.8-dicarboxylic acid with aryl-diazo compounds of the benzene and naphthalene series.

2. As a new process the herein described coupling of 3-amino-naphthalene-1.8-dicarboxylic acid with aryl-o-hydroxydiazo compounds of the benzene and naphthalene series.

3. As new products the herein described azo-dyestuffs derived from 3-amino-naphthalene-1.8-dicarboxylic acid, the general formula of which is characterized by the presence of a 1.8-naphthalic acid complex.

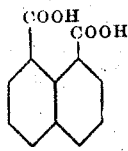

not containing any hydroxyl groups, which dyestuffs form yellow to brown and black powders, dissolving in water with yellow to brown and violet, in sulfuric acid with greenish-yellow to brown, red, violet and green-blue coloration, dyeing wool in an acid bath yellow to red, brown violet and grayish-blue tints, which by afterchroming are converted into greenish-yellow to red, brown, violet and green tints, and yielding, when printed on cotton with chromium mordants, yellow to red, brown, violet, green and gray tints.

4. As new products the herein described new azo dyestuffs corresponding in form of their sodium salts with the general formula:

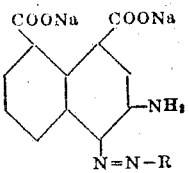

wherein R means an aromatic residue, which dyestuffs form yellowish-brown to black powders, dissolving in water with yellowish-red to violet, in sulfuric acid with greenish-yellow to brown, red, violet and green-blue coloration, dyeing wool in an acid bath yellow-red to reddish-brown and violet tints, and which by afterchroming are converted into greenish-yellow to red, brown, violet and green tints, yielding, when printed on cotton with chromium mordants, yellow to red, brown, violet, green and gray tints.

5. As new products the herein described new azo dyestuffs corresponding in form of their sodium salts with the general formula:

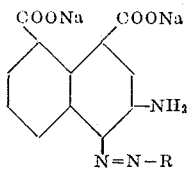

wherein R means an aromatic residue carrying a hydroxyl group in ortho position to the azo-bridge, which products form reddish-brown to black powders, dissolving in water with yellowish-brown to red, violet and brown, in sulfuric acid with greenish-yellow to red, violet and reddish-brown coloration, dyeing wool in an acid bath yellowish-olive to red, brown, violet and greenish-brown tints which are converted by afterchroming into yellowish-olive to red-brown, Bordeaux and green tints and yielding when printed on cotton with chromium mordants olive to greenish-gray, gray and brown tints.

6. Material dyed and printed with the new dyestuffs of claim 3.

7. Material dyed and printed with the new dyestuffs of claim 4.

8. Material dyed and printed with the new dyestuffs of claim 5.

In witness whereof we have hereunto signed our names this 20th day of July, 1925.

MAX ISLER.
LUCAS von MECHEL.